T. J. KING.
WEEDING OR CHOPPING HOE.
APPLICATION FILED JUNE 21, 1909.

932,872.

Patented Aug. 31, 1909.

Witnesses
G. M. Spring
M. E. Moore

Inventor
Thomas J. King

By David Moore
his Attorney

UNITED STATES PATENT OFFICE.

THOMAS J. KING, OF RICHMOND, VIRGINIA.

WEEDING OR CHOPPING HOE.

932,872.

Specification of Letters Patent.    Patented Aug. 31, 1909.

Application filed June 21, 1909.   Serial No. 503,432.

*To all whom it may concern:*

Be it known that I, THOMAS J. KING, a citizen of the United States, residing at Richmond, in the county of Henrico and State of Virginia, have invented certain new and useful Improvements in Weeding or Chopping Hoes, of which the following is a specification, reference being had therein to the accompanying drawing.

My present invention relates to an improved weeding or chopping hoe, the main object of my invention, being the provision of an attachment for a hoe, which is especially adapted for weeding and chopping close to a growing plant, such as cotton or corn.

I have found by experience, that the ordinary hoe, will not safely permit working close to growing plants without in many cases injuring the plant, and thereby ruining the stand; and it has therefore been my intention, to attach to a hoe a frame carrying either one or more teeth which parallel the outer edges of the hoe, and provide a space or spaces therebetween, so that the tooth or teeth may be operated close to the growing plant, weeding or chopping the weeds or grass growing in close proximity to the plant, without in any way injuring or loosening the main root of the plant. I have found by testing that many plants having a tap root that runs down into the earth several inches, can be safely weeded or cultivated with my device, and this more especially applies to cotton plants, for which my device is designed.

To clearly illustrate my invention, attention is invited to the accompanying drawings, in which:—

Figure 1:
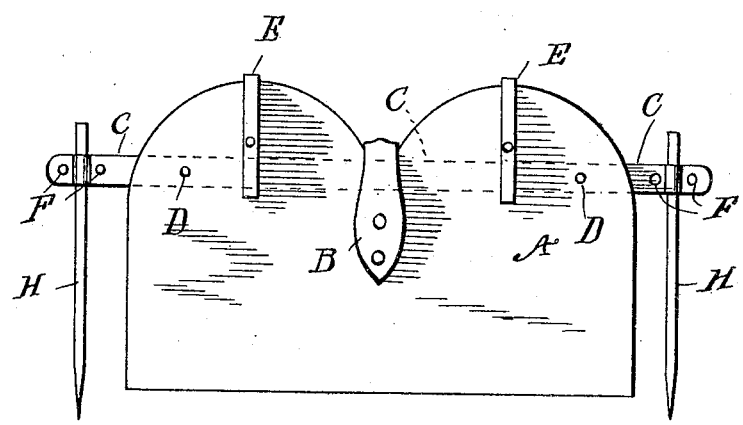
Figure 2:
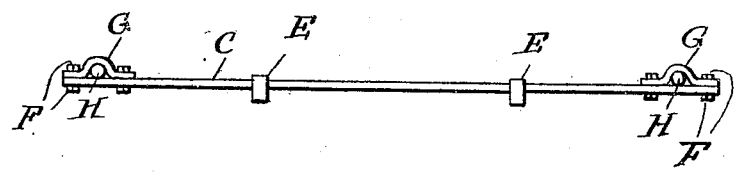

Figure 1 is an end view of a hoe with my device. Fig. 2 is a view of the device removed.

Referring to the drawings:—A designates the hoe proper, provided with the handle or helve attaching eye or plate B.

Upon the inner face of the hoe blade is the frame or rod C, which projects upon each side of the outer edges of the blade, and is secured to the blade by means of the two brads or rivets D, which pass through the frame and blade. I also employ the clamping plates E, which straddle the frame and blade and adjustably clamp the frame to the blade.

Adjustably secured by means of screws or bolts F, to the projecting end of the frame, are clamping plates G, by means of which the weeding or chopping teeth H, which may be arranged one or more upon each side of the hoe are held. These teeth are round in cross section, and are provided with a point, which enters the earth and cultivates the plant without injury, but allows grass and weeds having a spreading root to be pulled. By means of the clamping plates G, the teeth as they wear, may be adjusted, and when worn out, may be removed and replaced with new ones.

What I claim, as new, is:—

1. In combination with a hoe blade, of a frame carried thereby and having its ends projecting beyond the outer edges of the blade, and teeth adjustably carried in said projecting ends.

2. In combination with a hoe blade, of a frame carried thereby and paralleling the lower cutting edge of the blade, the ends of the frame projecting beyond the outer edges of the blade, and cylindrical teeth carried by the projecting end and substantially in line with the blade.

3. In combination with a hoe blade, of a frame secured thereto, clamping means for securing the frame to the blade, said frame being so arranged as to have its ends project beyond the outer edges of the blade, a clamping plate carried by each projecting end, and a tooth secured to the frame by each clamping plate.

4. In combination with a hoe blade, of a rod of sufficient length so as to have its ends project beyond the outer edges of the blade, means for securing the rod to the blade, clamping plates carried by the projecting ends of the rod, and teeth carried by said clamping plates.

In testimony whereof I affix my signature in presence of two witnesses.

THOMAS J. KING.

Witnesses:
  ARTHUR MANN,
  E. I. TRICE.